United States Patent
Buniewicz et al.

(10) Patent No.: US 7,527,308 B2
(45) Date of Patent: May 5, 2009

(54) MODULAR BUMPER SHELL

(75) Inventors: Krystof Buniewicz, Troy, MI (US); John A. Denison, Rochester Hills, MI (US); Abdi R. Lawassani, Waterford, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/230,400

(22) Filed: Sep. 20, 2005

(65) Prior Publication Data

US 2006/0192398 A1 Aug. 31, 2006

Related U.S. Application Data

(60) Provisional application No. 60/656,250, filed on Feb. 25, 2005.

(51) Int. Cl.
*B60R 19/04* (2006.01)
(52) U.S. Cl. .................... 293/117; 293/121; 280/164.1
(58) Field of Classification Search ......... 296/120–122; 293/120–122, 126, 149, 117, 151–153; 280/164.1
See application file for complete search history.

(56) References Cited

U.S. PATENT DOCUMENTS

| | | | | |
|---|---|---|---|---|
| 2,954,256 A | * | 9/1960 | Barenyi .................. | 293/136 |
| 3,578,358 A | * | 5/1971 | Reynolds ................ | 280/500 |
| 3,580,613 A | * | 5/1971 | Northrop ................ | 280/500 |
| 3,774,494 A | * | 11/1973 | Eger ...................... | 293/117 |
| 3,774,952 A | * | 11/1973 | Zorn ...................... | 293/117 |
| 3,989,292 A | * | 11/1976 | Bank et al. ............. | 293/110 |
| 4,072,334 A | * | 2/1978 | Seegmiller et al. ...... | 293/110 |
| 4,130,312 A | * | 12/1978 | Cooper, Sr. ............. | 293/153 |
| 4,171,143 A | * | 10/1979 | Huber et al. ............ | 293/121 |
| 4,385,779 A | * | 5/1983 | Kimura et al. .......... | 293/102 |
| 4,422,680 A | * | 12/1983 | Goupy ................... | 293/122 |
| 4,569,865 A | * | 2/1986 | Placek ................... | 428/31 |
| 4,570,986 A | * | 2/1986 | Sams ..................... | 293/117 |
| 4,765,665 A | * | 8/1988 | Akahoshi ................ | 293/102 |
| 4,811,979 A | * | 3/1989 | Peter et al. ............. | 293/102 |
| 5,123,688 A | * | 6/1992 | Takado et al. .......... | 293/120 |
| 5,560,662 A | * | 10/1996 | Apgar et al. ............ | 293/121 |
| 6,109,676 A | * | 8/2000 | Avis et al. .............. | 293/149 |
| 2004/0124644 A1 | * | 7/2004 | Miller et al. ........... | 293/117 |

* cited by examiner

*Primary Examiner*—Dennis H Pedder

(57) ABSTRACT

The present invention provides a modular bumper shell comprising an attachment member adapted for attachment to an energy-absorbing vehicle bumper substructure, and at least one outer member affixed to and at least partially covering the attachment member. The outer member is at least partially visible to an observer following vehicle assembly. The present invention also provides a method of assembling a modular bumper shell by providing an attachment member adapted for attachment to an energy-absorbing vehicle bumper substructure, providing at least one outer member, and attaching the outer member to the attachment member. The present invention further provides a method of changing the appearance of a vehicle bumper by providing a modular bumper shell including at least one outer member attached to an attachment member, and then replacing the outer member with a modified outer member.

11 Claims, 4 Drawing Sheets

MODULAR BUMPER SHELL

CROSS-REFERENCE TO RELATED APPLICATION

This application claims priority to U.S. Provisional Ser. No. 60/656,250, filed Feb. 25, 2005, which is hereby incorporated by reference.

TECHNICAL FIELD

The present invention relates to a modular bumper shell for an automotive vehicle bumper.

BACKGROUND OF THE INVENTION

Automotive vehicle bumpers typically include an energy absorbing substructure covered by a bumper shell. Traditionally, the bumper shell is of a one-piece construction, with an outer portion of the bumper shell being visible to an observer. Bumper shells are often plated with chrome or another aesthetically pleasing material to appeal to consumers. Because of the one-piece construction, the entire bumper shell must be plated to achieve this result.

SUMMARY OF THE INVENTION

The present invention provides a modular bumper shell comprising an attachment member adapted for attachment to an energy-absorbing vehicle bumper substructure, and at least one outer member affixed to and at least partially covering the attachment member. The outer member is at least partially visible from a vehicle exterior following vehicle assembly, while the attachment member may be substantially nonvisible from the vehicle exterior following vehicle assembly. Preferably, the attachment member is formed from a material sufficient to provide structural support to the modular bumper shell. The outer member may be formed from cold-rolled steel, hot-formed steel, extruded steel, extruded aluminum, high-strength plastic, or any other aesthetically appealing material. The outer member is preferably replaceable by a modified outer member to change the appearance of the modular bumper shell without replacing the attachment member. Additionally, the attachment member may be used with a plurality of different outer members.

The present invention also provides a method of assembling a modular bumper shell by providing an attachment member adapted for attachment to an energy-absorbing vehicle bumper substructure, providing an outer member, and attaching the outer member to the attachment member. If the modular bumper becomes damaged, or a different appearance is desired, the method can further include removing the outer member and attaching a modified outer member.

The present invention further provides a method of changing the appearance of a vehicle bumper by providing a modular bumper shell including at least one outer member attached to an attachment member, and then replacing the outer member with a modified outer member.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
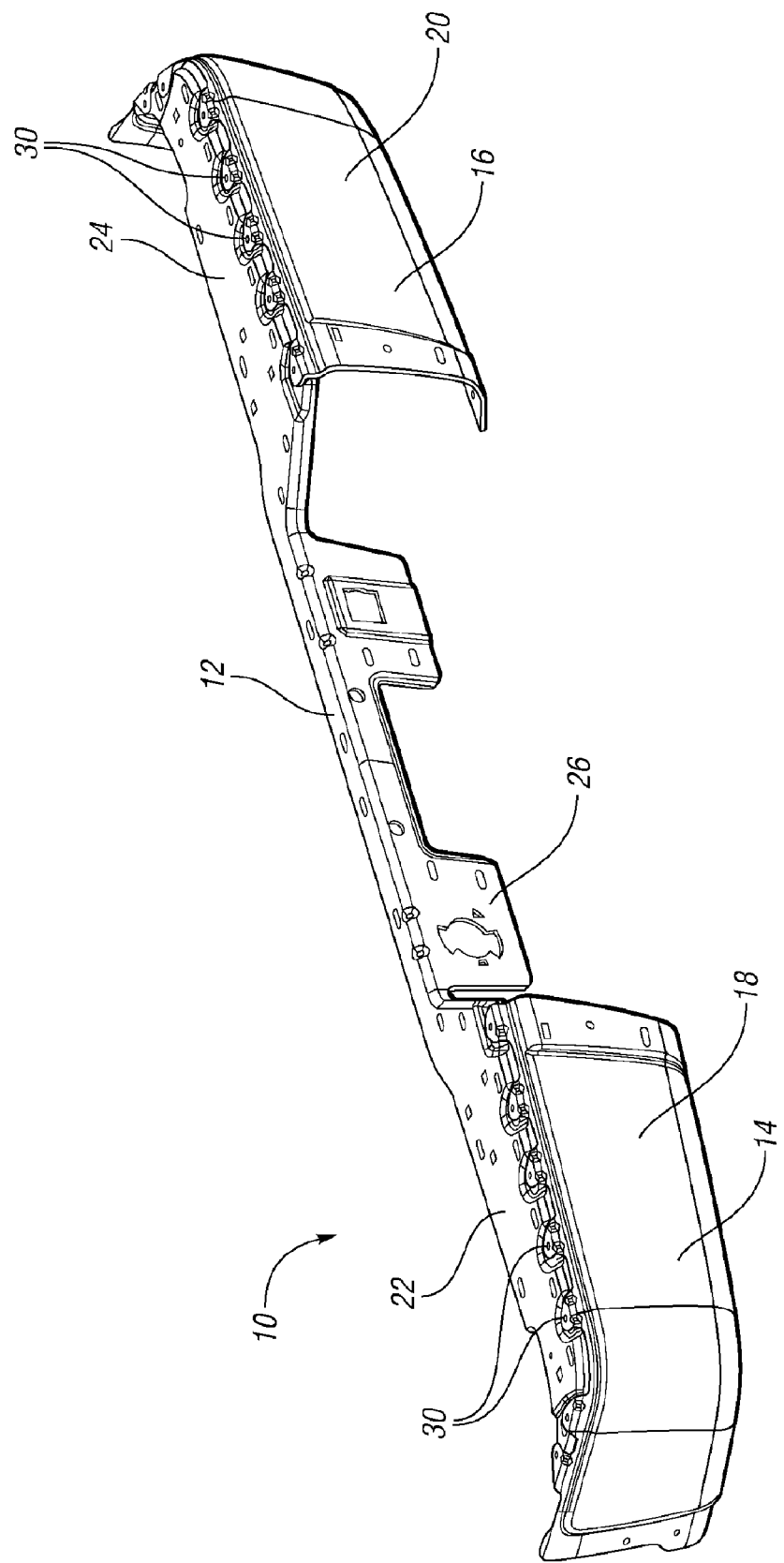
FIG. 1 is a schematic perspective view of a modular bumper shell according to the present invention.
Figure 2:
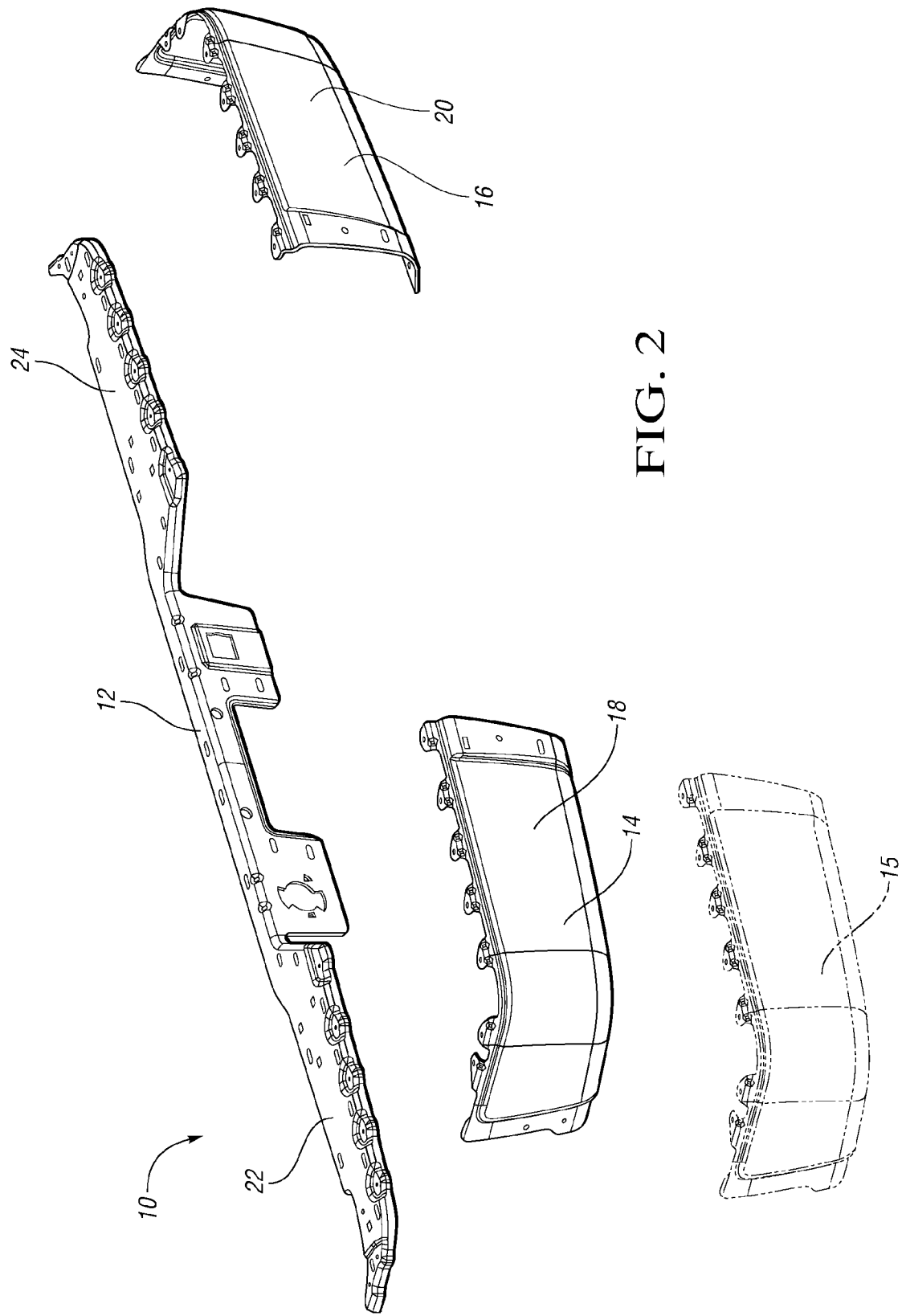
FIG. 2 is a schematic perspective view of component parts of the modular bumper shell of FIG. 1, including an attachment member and first and second outer members.

Referring to FIGS. 1 and 2, a modular bumper shell according to the present invention is generally shown at 10. The bumper shell 10 shown in the drawings is specifically configured for a rear bumper for a pick-up truck. However, the present invention can be utilized for any automotive vehicle bumper without changing the inventive concept.

As shown in the Figures, the bumper shell 10 includes three separate pieces: an attachment member 12, and first and second outer members 14, 16 having first and second outer surfaces 18, 20, respectively. The attachment member 12 includes first and second attachment portions 22, 24 and a step pad support 26. Preferably, the first outer member 14 attaches to the first attachment portion 22, while the second outer member 16 attaches to the second attachment portion 24. The outer members 14, 16 are preferably replaceable by a modified outer member, illustrated in phantom in FIG. 2 as element 15, to change the appearance of the modular bumper shell 10 without replacing the attachment member 12. While fasteners 30 are used to attach the first and second outer members 14, 16 to the attachment member 12 in the embodiment shown in the figures, the outer members 14, 16 may be attached to attachment member 12 in any way known in the art, including but not limited to welding or adhesives. The attachment member 12 is adapted for attachment to an energy-absorbing vehicle bumper substructure 32 (FIG. 3), thereby attaching the bumper shell 10 to the bumper substructure to form the vehicle bumper.

Figure 3:
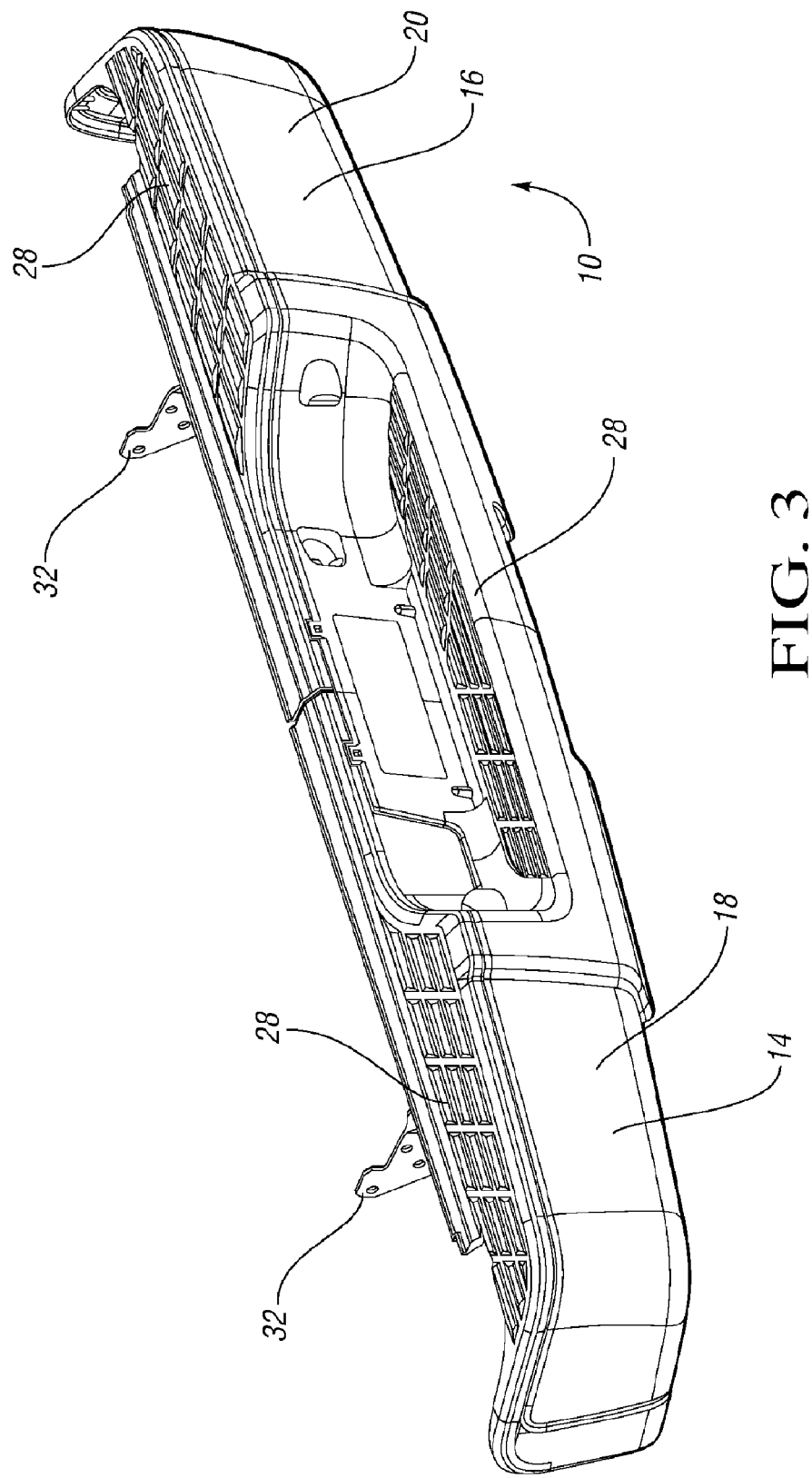
FIG. 3 is a schematic perspective view of the modular bumper shell of FIG. 1, including a step pad installed over the bumper shell.

Turning now to FIG. 3, the bumper shell 10 is shown with an optional step pad 28 installed, and with the first and second outer members 14, 16 plated with chrome. It can be seen from FIG. 3 that following installation of the step pad 28, the only portions of the bumper shell 10 outwardly visible are the first and second outer surfaces 18, 20 of the first and second outer members 14, 16. Therefore, an automotive manufacturer need not be concerned with the outward appearance of the attachment member 12. Thus, the attachment member 12 may be made from any material necessary for structural support. Since the outer members 14, 16 are primarily for aesthetic appeal, virtually any material may also be chosen for their construction as well. Typical material choices may include cold-rolled steel, hot-formed steel, extruded steel or aluminum, or high-strength plastics. However, the modular bumper shell design is not limited to these material choices.

To change the appearance of the bumper, the manufacturer need only change the appearance of the first and second outer members 14, 16. For example, if a consumer desires a chrome-plated bumper, only the first and second outer members 14, 16 must be plated. In contrast, use of a one-piece bumper shell requires plating of the entire shell. Thus, the modular bumper shell construction taught by the present invention results in a significant decrease in the amount of chrome needed to produce the same result over a traditional one-piece bumper shell. Also, since virtually any material may be used to form the attachment member 12 without concern with appearance, use of the modular bumper shell can reduce the mass of the bumper shell, resulting in increased fuel economy.

The modular construction also has other advantages. In the event of even minor damage to a one-piece bumper shell, the entire bumper shell must be replaced. However, minor damage to the bumper shell 10 of the present invention may require replacement of only a portion thereof. Additionally, since the appearance of the attachment member 12 is not of concern, a less expensive stamping may be used to manufacture the attachment member 12, as opposed to a draw die process generally preferred for parts which will be visible to a consumer. Additionally, the component parts of the bumper shell 10 of the present invention are much smaller than typical one-piece bumper shells. Therefore, smaller presses may be used to make the component parts, resulting in less scrap material due to reduced blank sizes for each component. Also, the component parts can be manufactured more quickly since they are smaller and easier to handle. The modular design also provides greater flexibility in bumper design. The same attachment member may be utilized with various outer members to create bumpers with differing appearances without requiring an entirely new set of tooling, and without changing the underlying energy-absorbing vehicle bumper substructure.

While first and second outer members 14, 16 do not overlap following attachment to the attachment member 12 in the embodiment shown in the figures, the first and second outer members 14, 16 may overlap without changing the inventive concept. For example, the attachment member may comprise a single attachment portion running the length thereof, without a step pad support. This would be the likely configuration for a car. The first and second outer members 14, 16 could then overlap slightly to fully cover the attachment member without changing the inventive concept. The bumper shell 10 must only have at least one outer member at least partially visible to an observer following vehicle assembly to practice the present invention. Additionally, while the illustrated embodiment of the modular bumper shell 10 uses a three-piece construction, any number of pieces may be used without comprising the inventive concept.

Figure 4:
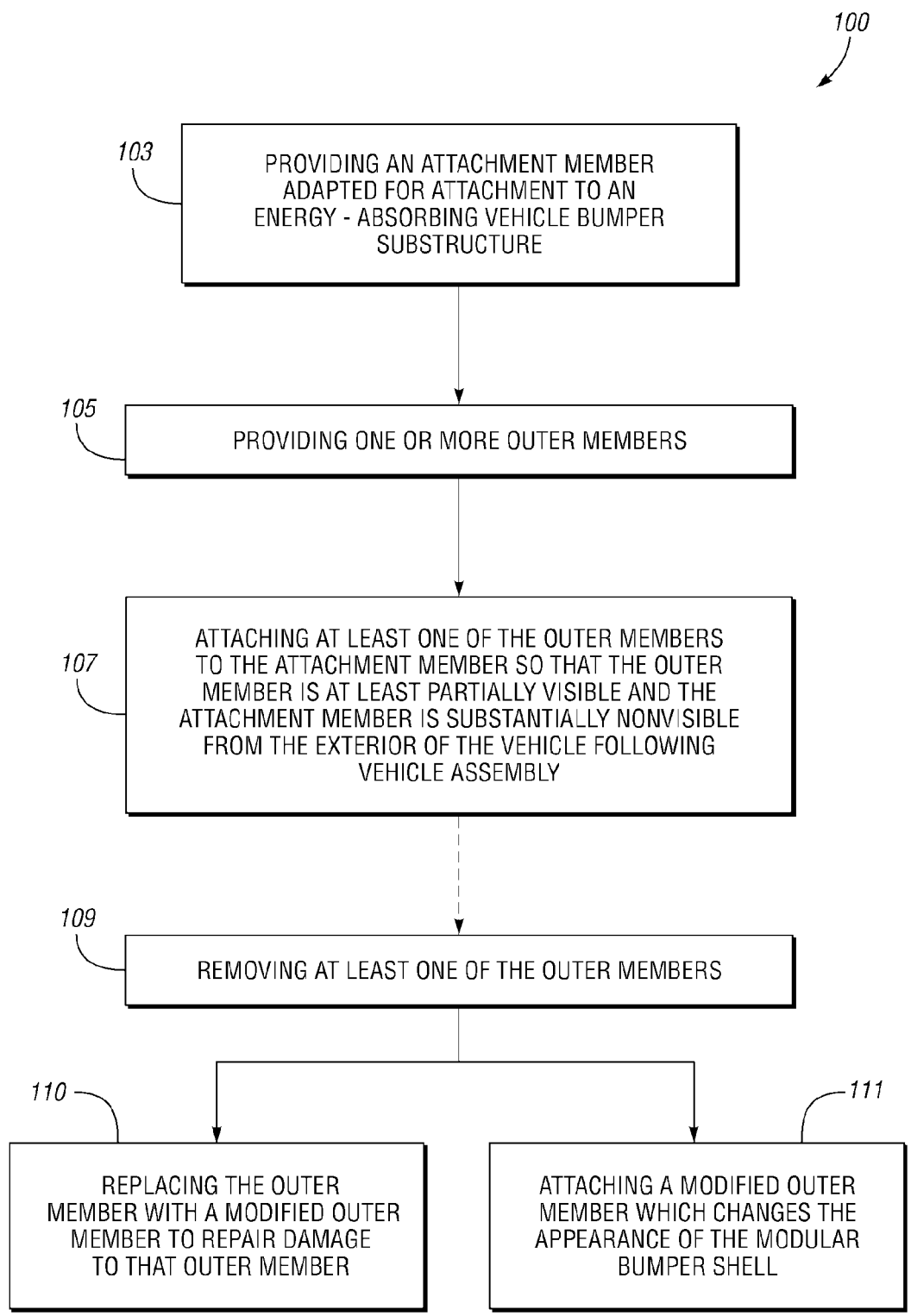
FIG. 4 is a flow chart illustrating a method of assembling a modular bumper shell and a method of changing the appearance of a vehicle bumper in accordance with the present invention.

An additional aspect of the present invention is to provide a novel method, shown generally as 100 in FIG. 4, of assembling a modular bumper shell 10. Although described below with respect to structure depicted in FIGS. 1-3, the following method may be employed with respect to any embodiment within the scope of the present invention discussed above. The method 100 includes, as step 101, providing an attachment member 12 adapted for attachment to an energy-absorbing vehicle bumper substructure 32. Step 105 requires providing at least one, but preferably two outer members 14, 16. Once steps 103 and 105 have been completed, step 107 involves attaching the one or more outer members 14, 16 to the attachment member 12 So that the outer member(s) 14, 16 is at least partially visible. By attaching the outer member(s) 14, 16, it is preferred that the attachment member 12 is thereby rendered substantially nonvisible from the exterior of the vehicle (not shown) following assembly.

Following assembly, if the modular bumper shell 10 is damaged, or a different appearance is desired, the method 100 preferably includes, as step 109, removing at least one of the outer members 14, 16. Subsequently, step 110 requires replacing the one or more outer members 14, 16 with a modified outer member 15 to repair any damage to that outer member 14, 16. Alternatively, step 111 requires attaching a modified member 15 to the attachment member 12 that changes the appearance of the modular bumper shell 10.

While the best mode for carrying out the invention has been described in detail, it is to be understood that the terminology used is intended to be in the nature of words and description rather than of limitation. Those familiar with the art to which this invention relates will recognize that many modifications of the present invention are possible in light of the above teachings. It is, therefore, to be understood that within the scope of the appended claims, the invention may be practiced in a substantially equivalent way other than as specifically described herein.

The invention claimed is:

1. A method of assembling a modular bumper shell comprising:
   providing an attachment member adapted for attachment to an energy-absorbing vehicle bumper substructure;
   providing at least two outer members, at least one of said outer members being selectively detachable from said attachment member without detaching said attachment member from said energy-absorbing vehicle bumper substructure or detaching the other of said outer members from said attachment member;
   attaching said at least two outer members directly to said attachment member such that said at least two outer members are at least partially visible from a vehicle exterior following vehicle assembly; and
   attaching a step pad member to said attachment member, whereby said attachment member is rendered nonvisible from the vehicle exterior following vehicle assembly.

2. The method of claim 1, wherein at least one of said at least two outer members is replaceable by a modified outer member, thereby changing the appearance of said modular bumper shell without replacing said attachment member.

3. The method of claim 1, wherein said attachment member may be used with a plurality of different outer members.

4. The method of claim 1, further comprising:
   removing at least one of said outer members; and
   attaching a modified outer member, thereby changing the appearance of said modular bumper shell.

5. A modular bumper shell comprising:
   an attachment member adapted for attachment to an energy-absorbing vehicle bumper substructure;
   at least two outer members affixed directly to and at least partially covering said attachment member, at least one of said outer members being detachable from said attachment member without detaching said attachment member from said energy absorbing vehicle bumper substructure or detaching the other of said at least two outer members from said attachment member; and
   a step pad member affixed to and at least partially covering said attachment member, wherein said attachment member is thereby rendered nonvisible from the vehicle exterior following vehicle assembly.

6. The modular bumper shell of claim 5, wherein said attachment member is formed from a material sufficient to provide structural support to said modular bumper shell.

7. The modular bumper shell of claim 5, wherein said at least two outer members are formed from one of cold-rolled steel, hot-formed steel, extruded steel, extruded aluminum, and high-strength plastic.

8. The modular bumper shell of claim 5, wherein said step pad member has an outer surface with an appearance finish that is visible from the vehicle exterior.

9. The modular bumper shell of claim 5, wherein said at least two outer members each have a respective outer surface with an appearance finish, and wherein said attachment member is characterized by the absence of an outer surface with an appearance finish.

10. The modular bumper shell of claim 5, wherein at least one outer member is replaceable by a modified outer member, thereby changing the appearance of said modular bumper shell without replacing said attachment member.

11. The modular bumper shell of claim 5, wherein said attachment member may be used with a plurality of different outer members.

\* \* \* \* \*